United States Patent
Brenner

[19]

[11] Patent Number: 6,088,493
[45] Date of Patent: Jul. 11, 2000

[54] FIBER SHUFFLE INTERCONNECTION APPARATUS AND METHOD

[75] Inventor: Tomas Brenner, Severna Park, Md.

[73] Assignee: CIENA Corporation, Linthicum, Md.

[21] Appl. No.: 09/128,892

[22] Filed: Aug. 4, 1998

[51] Int. Cl.[7] .................................................. G02B 6/26
[52] U.S. Cl. .......................................... 385/17; 359/109
[58] Field of Search ................................... 385/14, 17, 7;
359/125, 117, 109

[56] References Cited

U.S. PATENT DOCUMENTS

| | | | |
|---|---|---|---|
| 4,914,648 | 4/1990 | Acampara et al. | 359/125 |
| 5,165,104 | 11/1992 | Weverka | 385/7 |
| 5,416,861 | 5/1995 | Koh et al. | 385/14 |

*Primary Examiner*—Akm E. Ullah
*Attorney, Agent, or Firm*—Daniel N. Daisak; David L. Soltz

[57] ABSTRACT

An apparatus and method is provided for optical cross connections. A guide structure is used to guide optical fiber fed to various stations on the guide structure which correspond to input and output ports of a fiber shuffle interconnect. Once the fiber has been positioned about the guide structure, the fiber is arranged such that the input and output ports of the interconnect align allowing the fibers to be bundled to a common input and/or output port. In this manner, once the fiber is arranged about the guide structure, fiber management becomes an easy task because the number of fiber bundles is significantly smaller than the total number of individual fibers.

24 Claims, 5 Drawing Sheets

1D LINEAR ARRAY

FIBER SHUFFLE INTERCONNECTION APPARATUS AND METHOD

FIELD OF INVENTION

The present invention relates generally to optical communication systems and more particularly to an apparatus and method for optical cross connections.

BACKGROUND OF INVENTION

Optical communication systems are a substantial and fast-growing constituent of communication networks because of their large transmission bandwidth and low signal losses. Currently, the majority of optical communication systems are point-to-point networks configured to carry optical signals over one or more optical waveguides from a transmit terminal to a receive terminal. The use of optical communication systems has also expanded into local network architectures, such as local area networks (LANs), metropolitan area networks (MANs) and wide area networks (WANs).

Currently, communications networks employ optical fiber as the transmission medium and electronic devices for processing of the received signals. In this type of network, switching is performed by electronic components where the optical signals transmitted over a fiber are first converted to their electronic equivalent and subsequently processed. However, electronic switches are better suited for use at transmission data rates lower than the current state of the art. This necessitates electronically demultiplexing the signals, performing the switching, then multiplexing the signals up to the transmission rate. A drawback associated with these switching systems is the introduction of unwanted processing delays into the network caused by converting signals from optical to electrical and back to optical form. Thus, the speed advantage associated with optical signal transmission is compromised. Moreover, these electronic switches have to be adapted for a given data rate and format within a communications network. With the increasing signal bit rates, for example 10 Gbps, electrical connections between the individual switching elements is difficult and an optical solution is preferred. In a WDM environment optical switches offer the advantage that they can switch a multiple of transmit signals simultaneously without requiring optical demultiplexing as required for single channel electronic switching.

Optical switches are transparent in that they allow signal transmission independent of data rate and format. Consequently, optical switching components as well as high speed electronic cross point switches are being developed to accommodate increasing complexity associated with large optical communications networks.

Large optical or electronic switches can be constructed from smaller switching elements with the number of input and output ports ranging from, for example, 2 to 32. One approach to build these large switches from small switching elements is the Clos Architecture. The basics of this type of switch are discussed in "A Study of Non-Blocking Switching Networks" by Charles Clos, The Bell System Technical Journal, March 1953, pp. 406–424. This type of switch requires at least three stages to provide connections from an input to a particular output from among all the possible connections within the switch which is referred to as "non-blocking." FIG. 1 is a block diagram of a portion of a switch 10 using the Clos Architecture. The input stage 15 includes K×N switching elements $20_1 \ldots 20_M$, the next stage 30 includes M×L switching elements $35_1 \ldots 35_N$, where M and N are integers. Accordingly, the number of connections (electrical or optical) needed to interconnect stages 15 and 30 is given by M×N. By way of example, where M=64 and N=64, 4096 connections are needed to connect the two stages in a non-blocking configuration. The switching elements $20_1 \ldots 20_M$, $35_1 \ldots 35_N$ may be electrical or optical. Such optical switching elements include directional couplers, digital optical switches, opto-mechanical switches, etc. When optical elements are employed, the switching process and transmission of signals between the switching stages are in optical form. Stages 15 and 30 can also include electrical switching elements with optical interconnection by means of transmitters and receivers at the respective inputs and outputs of each stage. This configuration may be useful, for example, when the various stages of a switch are physically separated, thereby making electrical transmission between stages less advantageous.

In the simplified example illustrated in FIG. 1, each input stage switching element $20_1 \ldots 20_M$ has K=5 inputs and N=2 outputs. Each stage 30 switching element $35_1 \ldots 35_N$ has M=4 inputs and L=8 outputs.

Currently, the manufacturing process for the fiber interconnection pattern 25 between switching stages is performed either manually or by robot arms. In each of these cases, individual fibers are connected from output ports of switching elements $20_1 \ldots 20_M$ to input ports of switching elements $35_1 \ldots 35_N$. As described above, with the increasing complexity of these switches, the number of connections can run into the thousands and tens of thousands. This presents a large number of individual fibers to manage. This can cause problems when attempting to trace a particular connection, for example, when a fault or break occurs, or merely trying to keep track of input/output connections when forming such a non-blocking switch configuration. Moreover, optical fiber is bend sensitive. This can cause problems when installing and handling the high number of fibers when forming the interconnects.

Thus, there is a need to provide an apparatus and method which simplifies the process of forming optical fiber interconnects between switch stages.

SUMMARY OF INVENTION

The present invention meets these needs and avoids the above-referenced drawbacks by providing a method and apparatus which is used to form optical fiber interconnects within a shuffle network architecture.

In accordance the present invention, a method of interconnecting a multiple stage shuffle network is provided which comprises the steps supplying optical fiber to a guide structure which includes a plurality of stations corresponding to input and output ports of the interconnection. The fiber is aligned along the guide structure from at least one of the plurality of stations corresponding to an input port to at least one of the plurality of stations corresponding to an output port where the predetermined path of the guide structure defines a connection pattern from an input port to an output port.

In accordance with another aspect of the present invention an apparatus is provided which simplifies the process of interconnecting optical fibers within a network. The apparatus comprises a substantially spherical guide having a northern section, a southern section and an equator. A first group of retainers is positioned along the northern section. A second group of retainers is positioned along the southern section. A plurality of input and output ports is arranged along the equator. Optical fiber is supplied which traverses the guide from at least one of the plurality of input ports to either of the first or second group of retainers along the northern or southern sections, to at least one of the plurality of output ports.

DETAILED DESCRIPTION

Figure 1:
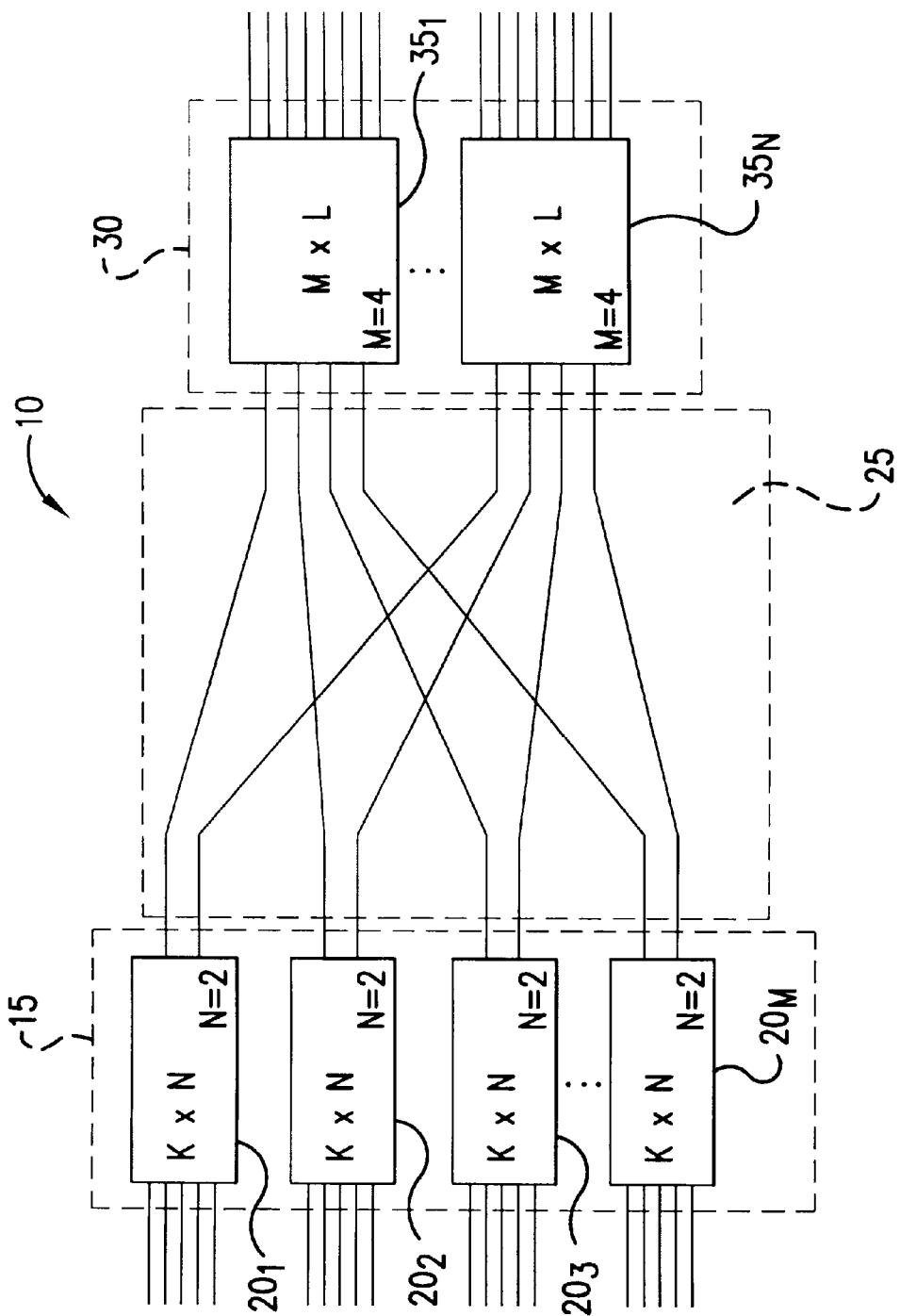
FIG. 1 is a block diagram illustrating a portion of an optical switch.
Figure 2:
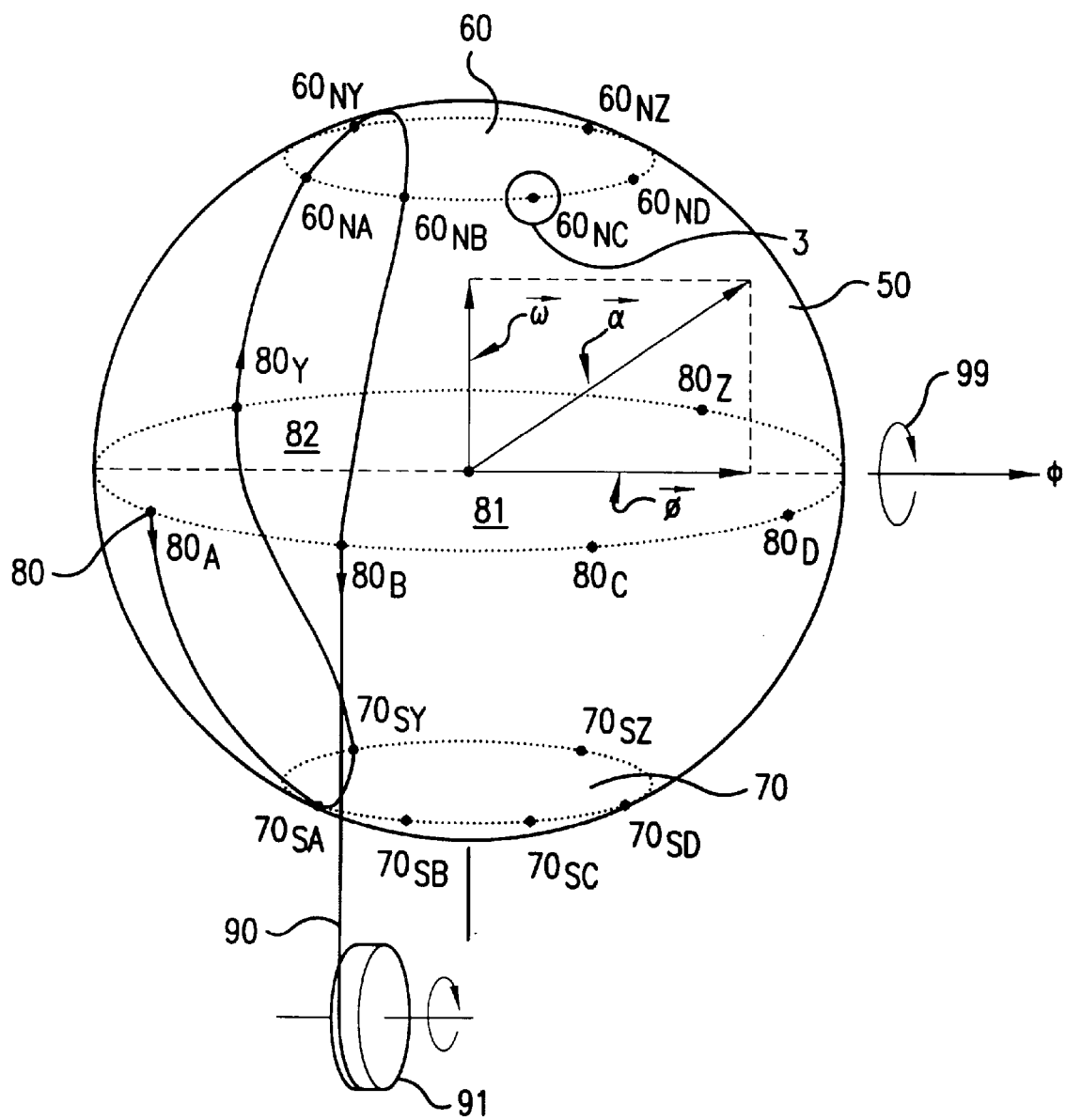
FIG. 2 is a schematic illustration of an apparatus in accordance with the present invention.

Turning to the drawings in which like reference characters indicate the same or similar elements, FIG. 2 schematically illustrates an apparatus used to fabricate a 4 by 2 fiber shuffle network interconnect. Although this simplified configuration is being used for ease of explanation, it should be understood that the shuffle network, method and device used to fabricate the interconnection in accordance with the present invention are not only applicable, but intended for interconnects employing a large number of fibers.

A guide structure 50 is used to guide fiber 90 to various stations on guide 50 which correspond to input and output ports of a fiber shuffle interconnect. Once the fiber as been positioned about the guide structure, the fiber is arranged such that the input and output ports of the interconnect align allowing the fibers to be bundled to a common input and/or output port. In this manner, once the fiber is arranged about the guide structure, fiber management becomes an easy task because the number of fiber bundles is significantly smaller (M+N) than the total number of individual fibers (M×N).

Although guide structure 50 is shown as a sphere, any guide structure which is capable of aligning optical fiber with input and output ports for a shuffle network interconnect can be employed. Guide structure 50 includes a northern hemisphere ring 60, a southern hemisphere ring 70 and an equator ring 80. The latitude of the northern ring 60 and southern ring 70 can be, but doesn't necessarily need to be, of equal and opposite sign. The equator ring 80 includes a plurality of stations on its eastern hemisphere 81 (0° to 180° longitude) corresponding to in put ports $80_A$, $80_B$, $80_C$ and $80_D$ and a plurality of stations on the western hemisphere 82 (0° to –180° longitude) corresponding to output ports $80_Y$ and $80_Z$ where the number of input and output ports can have even port counts. Although ring 80 is referred to as the "equator" ring, it is not required to be located in the median plane of guide 50. Rather, equator ring 80 is disposed between two rings, a first ring 60 positioned in a northerly relationship to ring 80 and a second ring 70 positioned in a southerly relationship to ring 80.

The northern hemisphere 60 includes retaining points corresponding to the input and output ports positioned around equator 80. In particular, northern hemisphere 60 includes retaining points $60_{NY}$, and $60_{NZ}$ corresponding with output stations $80_Y$ and $80_Z$, respectively as well as retaining points $60_{NA}$, $60_{NB}$, $60_{NC}$ and $60_{ND}$ corresponding to input stations $80_A$, $80_B$, $80_C$ and $80_D$, respectively. Similarly, southern hemisphere 70 includes retaining points $70_{SY}$, and $70_{SZ}$ corresponding with output stations $80_Y$ and $80_Z$, respectively as well as retaining points $70_{SA}$, $70_{SB}$, $70_{SC}$ and $70_{SD}$ corresponding to output stations $80_A$, $80_B$, $80_C$, and $80_D$ respectively. In a preferred embodiment, for each station associated with an input and/or output port on equator ring 80, there exists at least two corresponding ports, one on northern hemisphere 60 and one on southern hemisphere 70.

Although northern and southern hemispheres 60 and 70 as well as equator 80 are shown in FIG. 2 as rings, any configuration which has points and stations corresponding to input and output ports may be employed in accordance with the present invention. Moreover, the size of each hemisphere and equator ring, their relative positions on guide 50 and the number of retaining points and stations thereon, respectively, can vary with the type of guide structure used and the number of input and output ports forming the shuffle network interconnect with the number of input and output ports being an even number as well as the size of the retaining stations.

Figure 3:
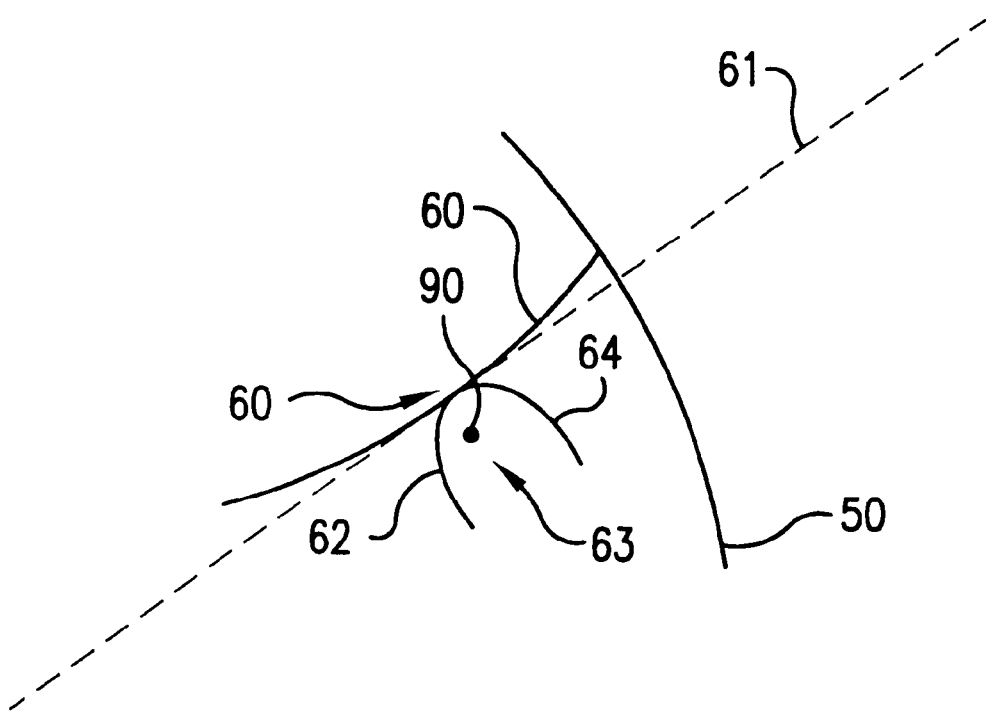
FIG. 3 is an expanded partial view of a retaining point taken from section 3 of FIG. 2.

The retaining points around hemispheres 60 and 70 and the stations around equator 80 have fingers which extend perpendicular to the tangential plane at the respective points and stations $60_{NY}$, $60_{NZ}$, $60_{NA}$, $60_{NB}$, $60_{NC}$, $60_{ND}$, $70_{SY}$, $70_{SZ}$, $70_{SA}$, $70_{SB}$, $70_{SC}$, $70_{SD}$, $80_Y$, $80_Z$, $80_A$, $80_B$, $80_C$, and $80_D$ around each ring. This can be better understood with reference to FIG. 3 which is an expanded partial view of a retaining point $60_{NC}$, as an example, at section 3 of FIG. 2. Retaining point $60_{NC}$ includes fingers 62 and 64 which extend perpendicular to plane 61 which is tangential about point $60_{NC}$ along hemisphere 60. Fingers 62 and 64 can be made from any substantially rigid material or composition of materials necessary to contain optical fibers. Fingers 62 and 64 form receptacle area 63 therebetween and can be integrally coupled to guide structure 50. Receptacle area 63 is adapted to receive fiber 90. Obviously, if fiber 90 is positioned about retaining point $60_{NC}$ and aligned with station $80_C$ for multiple connections, the fiber will accumulate in receptacle area 63 and fingers 62 and 64 are configured to extend substantially perpendicular to tangential plane 61 a sufficient distance to contain the fiber.

The fingers, e.g. 62 and 64, which comprise each of the retaining points on the hemispheres 60, 70 as well as equator 80 can be viewed together as forming combs. In other words, each hemisphere 60 and 70 includes a plurality of retaining points where each retaining point includes at least a pair of fingers which, when taken together, form a comb or comb-like structure around the respective hemisphere rings. Similarly, equator 80 includes a plurality of stations where each station includes a pair of fingers, which when taken together, form a comb-like structure around the equator ring. Thus, the fingers of the combs associated with points and stations on a first half of rings 60, 70 and 80, for example $60_{NA}$, $60_{NB}$, $60_{NC}$, $60_{ND}$, $70_{SA}$, $70_{SB}$, $70_{SC}$, $70_{SD}$ and $80_A$, $80_B$, $80_C$, $80_D$ correspond to the input ports of the shuffle interconnect; and the fingers on the combs associated with points and stations on a second half of rings 60, 70 and 80, for example, hemispheres $60_{NY}$, $60_{NZ}$, $70_{SY}$, $70_{SZ}$, $80_Y$ and $80_Z$, correspond to the output ports of the shuffle interconnect.

Returning to FIG. 2, fiber 90 is supplied, for example, by spool 91 and can be either multimode or single mode fiber depending on the network application. Guide 50 can be rotated about an axis Φ while controlling th e rotational angle to align the fiber with the fingers of intended stations on equator 80 and the fingers of the intended points about hemispheres 60 and 70. Variations in the speed of rotation, the angle of rotation and the rotation around axis Φ can be implemented in order to align the fiber along a connection pattern. The magnitude of rotational vector $\vec{\phi}$ and the magnitude of rotational vector $\vec{\omega}$ about axis $\Phi$ produces a resultant angular vector $\vec{\alpha}$ which represents the direction of rotation of guide 50. FIG. 2 illustrates an example of the magnitude of these vectors associated with guide 50. Generally, by varying the magnitude of vectors $\vec{\phi}$ and $\vec{\omega}$, the magnitude of the resultant vector $\vec{\alpha}$ will change, thereby determining the angle of rotation of guide 50 and consequently the alignment of fiber 90 consistent with an interconnection pattern. Alternatively, fiber 90 may be aligned with the stations and retainers of guide 50 by moving and/or rotating spool 91 and rotating guide 50 around axis $\Phi$. In this manner, spool 91 can be moved relative to guide 50 in order to align the fiber according to an interconnection pattern.

The interconnection of any two arbitrary stations or points around guide structure 50 can be governed by the principle that the input port corresponding to a station on the first portion of equator ring 80 is connected to an output port corresponding to a station on the second portion of ring 80 by routing the fiber through equivalent paths, either by traversing the northern hemisphere 60 or the southern hemisphere 70. For example, if input port corresponding to station $80_A$ is to be connected to output port corresponding to station $80_Y$, then fiber 90 is supplied from station $80_A$ to point $70_{SA}$ on southern hemisphere 70, to point $70_{SY}$ also on southern hemisphere 70, and then to station $80_Y$ on equator ring 80. Alternatively, the same connection from input port corresponding to station $80_A$ to output port corresponding to station $80_Y$ can be performed by supplying fiber 90 in the reverse direction depending on the direction of rotation of guide 50. The connection from $80_A$ to $80_Y$ can be performed by supplying fiber 90 from station $80_A$ to point $60_{NA}$ on northern hemisphere 60, to point $60_{NY}$ also on northern hemisphere 60, and then to station $80_Y$ on equator ring 80.

As another example, if input port corresponding to station $80_C$ is to be connected to output port corresponding to station $80_Y$, then fiber 90 is supplied from station $80_C$ to point $60_{NC}$ on northern hemisphere 60, to point $60_{NY}$ also on northern hemisphere 60, and then to station $80_Y$ on equator ring 80. Alternatively, the same connection from input port corresponding to station $80_C$ to output port corresponding to station $80_Y$, can be made by supplying fiber 90 from station $80_C$ to point $70_{SC}$ on southern hemisphere 70, to point $70_{SY}$ also on southern hemisphere 70 and then to station $80_Y$ on equator ring 80. Whether the northern ring 60 or the southern ring 70 are used depends on the direction of rotation of guide 50 and is irrelevant for the final fiber shuffle interconnect.

A fiber shuffle connection pattern is formed by continuously rotating guide 50 at an angular velocity and by controlling the rotational angle of guide 50 (or by moving/rotating spool 91) such that fiber 90, which is a fiber stand, is aligned with stations on ring 80 and points on rings 60 and 70.

This can be better understood with a basic example (four input ports $80_A$, $80_B$, $80_C$ and $80_D$ connected to two output ports $80_Y$ and $80_Z$) of an interconnection pattern in accordance with the present invention. To form this interconnect, each input station is connected to each output station via fiber 90. For the purposes of this example and as shown in FIG. 2, the path of fiber 90 is from $80_A$ to $70_{SA}$ to $70_{SY}$ to $80_Y$ to $60_{NY}$ to $60_{NB}$ to $80_B$ to $70_{SB}$ to $70_{SZ}$ to $80_Z$ to $60_{NZ}$ to $60_{NC}$ to $80_C$ to $70_{SC}$ to $70_{SY}$ to $80_Y$ to $60_{NY}$ to $60_{ND}$ to $80_D$ to $70_{SD}$ to $70_{SZ}$ to $80_Z$ to $60_{NZ}$ to $60_{NA}$ to $80_A$. It should be understood that the above described path of fiber 90 is arbitrary and does not limit in any way the teaching of the present invention.

Guide 50 is rotated in the direction of arrow 99 about axis $\Phi$ at a resultant angle of rotation and fiber 90 is supplied by spool 91 to the corresponding fingers in each of the combs on the respective rings. As stated above, spool 91 can also be moved/rotated in relation to guide structure 50 to properly align the fiber. Fiber 90 is kept tangential to the meridians of guide 50 in order to accommodate the bend sensitivity of the fiber. As stated above, an input is connected to an output by aligning fiber 90 through equivalent paths, either by traversing the northern hemisphere 60 or the southern hemisphere 70 depending on the direction of rotation of guide 50 about axis $\Phi$. In this example, guide 50 is rotated in direction 99.

During the process of forming the network interconnect, continuous monitoring can be performed to ensure the integrity of fiber 90. In particular, a light source such as a semiconductor laser can be used to introduce a light signal at a first end of fiber 90. A receiver, such as an avalanche photodiode or pin diode positioned at a second end of fiber 90 can receive the light signal and measure signal attenuation. In this manner, a fiber break or other problem can be detected and fiber integrity can be ensured before proceeding.

Once the connection pattern is formed about guide 50, the fiber, which up to now is a single continuous segment, is cut about the equator ring 80 as referenced by line 110 in FIG. 2. After cutting, essentially two spider-like interconnections are formed, a first interconnection at northern hemisphere 60 and a second at southern hemisphere 70. Hemispheres 60 and 70 can either collapse onto equator ring 80 or the respective interconnections can be displaced from guide 50 and disposed on each other such that the input/output stations and the corresponding retaining points are united. In particular, input station $80_A$ aligned with retaining points $60_{NA}$ and $70_{SA}$, input station $80_B$ is aligned with retaining points $60_{NB}$ and $70_{SB}$, input station $80_C$ is aligned with retaining points $60_{NC}$ and $70_{SC}$, input station $80_D$ is aligned with retaining points $60_{ND}$ and $70_{SD}$, output station $80_Y$ is aligned with retaining point $60_{NY}$ and $70_{SY}$, and output station $80_Z$ is aligned with retaining point $60_{NZ}$ and $70_{SZ}$.

Figure 4:
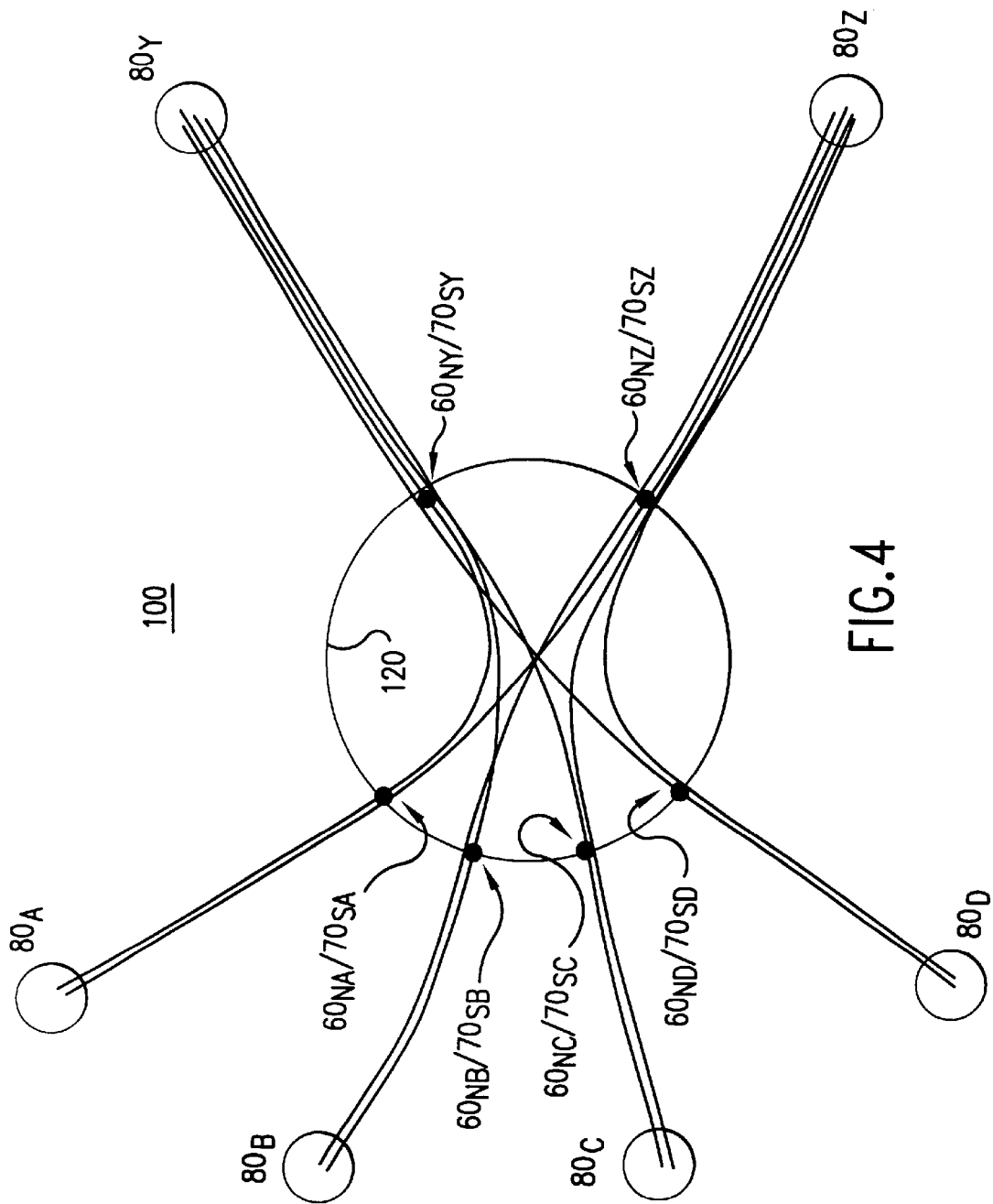
FIG. 4 is a schematic illustration of an optical interconnect in accordance with the present invention.

FIG. 4 schematically illustrates a resulting four by two (by way of example) fiber shuffle network 100 with its basic elements: connection web 120; fiber bundles $125_A$, $125_B$, $125_C$, $125_D$, $130_Y$, and $130_Z$; and fiber termination at input stations $80_A$, $80_B$, $80_C$, $80_D$ and output stations $80_Y$ and $80_Z$. Fiber bundles $60_{NA}/70_{SA}$, $60_{NB}/70_{SB}$, $60_{NC}/70_{SC}$, $60_{ND}/70_{SD}$, $60_{NY}/70_{SY}$, $60_{NZ}/70_{SZ}$ about web 120 correspond to each of the northern and southern hemisphere retaining points associated with each of the input stations $80_A$, $80_B$, $80_C$, $80_D$ and each output station $80_Y$ and $80_Z$ from guide structure 50. As hemispheres 60 and 70 are combined, these fiber bundles. Connection web 120 may be housed in a box-like structure to allow for more manageable fiber handling.

Figure 5:
FIGS. 5–7 are alternative arrangements of fiber terminations within fiber bundles in accordance with the present invention.
Figure 6:
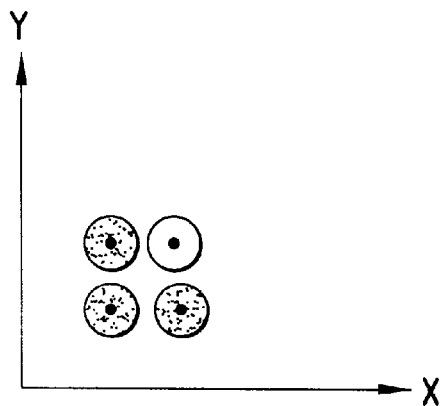
Figure 7:
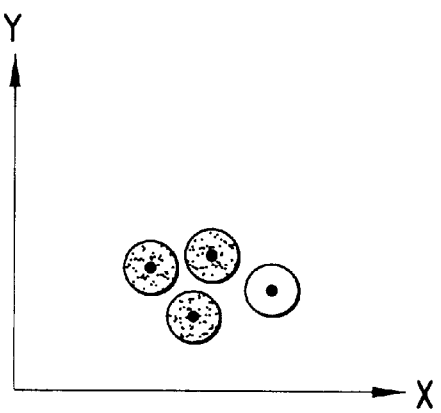

To manage the large number of fibers which form the resulting fiber bundles $60_{NA}/70_{SA}$, $60_{NB}/70_{SB}$, $60_{NC}/70_{SC}$, $60_{ND}/70_{SD}$, $60_{NY}/70_{SY}$, $60_{NZ}/70_{SZ}$, various configurations may be used. As an example, FIG. 5 illustrates fiber bundle $60_{NY}/70_{SY}$ of interconnect 100 where the four individual fibers terminating at output station $80_Y$ are organized in a one dimensional array. An arrangement procedure can be used to identify a particular fiber within the bundle. FIG. 6 illustrates an alternative arrangement where the four fibers which comprise fiber bundle $60_{NY}/70_{SY}$ are organized in a two dimensional array. FIG. 7 illustrates another alternative arrangement of the fibers in fiber bundle $60_{NY}/70_{SY}$ in a random array. Each of the fiber bundles can be arranged in any of these configurations or in a combination thereof within the shuffle interconnect.

As stated above, the principles of the invention have been described with reference to a four by two interconnect. However, it should be clear from the foregoing descriptions that these principles are applicable to interconnects comprising hundreds or thousands of fiber connections within a shuffle network.

While the foregoing invention has been described in terms of the embodiments discussed above, numerous variations are possible. Accordingly, modifications and changes such as those suggested above, but not limited thereto, are considered to be within the scope of the present invention.

What is claimed is:

1. A method for interconnecting stages of an optical shuffle network, said interconnection having a plurality of input and output ports, said method comprising the steps of:

supplying optical fiber to a guide structure, said guide having a plurality of stations corresponding to said plurality of input and output ports; and aligning said optical fiber along said guide structure from at least one of said plurality of stations corresponding to one of said input ports to at least one of said plurality of stations corresponding to one of said output ports defining a connection pattern from said input port to one of said output ports.

2. The method in accordance with claim 1 further comprising the step of rotating said guide structure along a predetermined path corresponding to said connection pattern.

3. The method in accordance with claim 1 wherein said method further comprises the step of positioning said optical fiber within at least one retainer associated with each of said stations.

4. The method in accordance with claim 2 wherein said step of rotating further comprises the step of rotating said guide structure at an angle of rotation about a predetermined axis associated with said guide structure.

5. The method in accordance with claim 1 further comprising the step of maintaining said fiber tangential to each of said plurality of stations.

6. The method in accordance with claim 1 wherein said guide structure comprises first, second and third portions, said third portion disposed between said first and second portions, each of said portions having retaining points associated with each of said stations, said method further comprising the step of separating said optical fiber along said third portion such that a first interconnection pattern is associated with said first portion and a second interconnection pattern is associated with said second portion.

7. The method in accordance with claim 6 further comprising the step of aligning said input and output stations on said first and second portions such that each of said retaining points align with their corresponding input and output stations.

8. The method in accordance with claim 1 further comprising the step of monitoring said optical fiber during said alignment.

9. The method in accordance with claim 8 wherein said step of monitoring further comprises:

transmitting a light signal from a first end of said optical fiber; and detecting said light signal at a second end of said optical fiber.

10. The method in accordance with claim 1 wherein each of said plurality of stations is positioned along a center portion of said guide structure.

11. The method in accordance with claim 10 wherein each of said plurality of stations has a first and a second corresponding retaining points positioned along said guide structure, said method further comprising aligning said fiber with at least one of said first or second retaining points.

12. The method in accordance with claim 1 further comprising the step of maneuvering said fiber about said guide structure along a predetermined path corresponding to said connection pattern.

13. The method in accordance with claim 11 wherein said plurality of stations is disposed between said first and second retaining point.

14. The method in accordance with claim 13 wherein said first retaining point is positioned in a northern portion of said guide structure with respect to said center portion and said second retaining point is positioned in a southern portion of said guide structure with respect to said center portion.

15. An optical interconnection apparatus comprising:

a guide having a first, second and third sections, said third section disposed between said first and second sections;

a first group of retainers positioned along said first section;

a second group of retainers positioned along said second section;

a plurality of input and output ports arranged along said third section; and optical fiber configured to traverse said guide from at least one of said plurality of input ports to either one of said group of retainers along said first section or one of said group of retainers along said second section, to at least one of said plurality of output ports.

16. The apparatus in accordance with claim 15 wherein said guide includes an axis, said guide configured to rotate about said axis at a rotational angle such that said guide rotates in a predetermined path to align said optical fiber with said input and output ports, said predetermined path defining a connection pattern between said input and output ports.

17. The apparatus in accordance with claim 15 wherein said guide is configured to rotate with an angular velocity.

18. The apparatus in accordance with claim 15 wherein said optical fiber is a continuous strand.

19. The apparatus in accordance with claim 15 wherein said first group of retainers comprises at least a first and second retaining members.

20. The apparatus in accordance with claim 15 wherein said second group of retainers comprises at least a first and second retaining members.

21. The apparatus in accordance with claim 15 wherein each of said input ports includes a retaining element adapted to receive said optical fiber.

22. The apparatus in accordance with claim 15 wherein each of said output ports includes a retaining element adapted to receive said optical fiber.

23. The apparatus in accordance with claim 19 wherein said first and second retaining members extend perpendicular to said guide structure, said first and second retaining members forming a receptacle area therebetween.

24. The apparatus in accordance with claim 20 wherein said first and second retaining members extend perpendicular to said guide structure, said first and second retaining members forming a receptacle area therebetween.

* * * * *